United States Patent
Tavvala et al.

(10) Patent No.: US 10,350,996 B2
(45) Date of Patent: Jul. 16, 2019

(54) VEHICLE WITH REAR DRIVE AXLE ASSEMBLY AND THE ABILITY TO NEUTRALIZE

(71) Applicants: VOLVO TRUCK CORPORATION, Göteborg (SE); Krishna Kanth Tavvala, Hagerstown, MD (US); Michael E. Kahl, Hagerstown, MD (US)

(72) Inventors: Krishna Kanth Tavvala, Hagerstown, MD (US); Michael E. Kahl, Hagerstown, MD (US)

(73) Assignee: Volvo Truck Corporation, Göteborg (SE)

( * ) Notice: Subject to any disclaimer, the term of this patent is extended or adjusted under 35 U.S.C. 154(b) by 401 days.

(21) Appl. No.: 15/034,641

(22) PCT Filed: Nov. 27, 2013

(86) PCT No.: PCT/US2013/072211
§ 371 (c)(1),
(2) Date: May 5, 2016

(87) PCT Pub. No.: WO2015/080722
PCT Pub. Date: Jun. 4, 2015

(65) Prior Publication Data
US 2016/0280066 A1   Sep. 29, 2016

(51) Int. Cl.
*B60K 17/36* (2006.01)
*B60K 23/08* (2006.01)

(52) U.S. Cl.
CPC .............. *B60K 23/08* (2013.01); *B60K 17/36* (2013.01)

(58) Field of Classification Search
CPC ................................ B60K 17/36; B60K 23/08
See application file for complete search history.

(56) References Cited

U.S. PATENT DOCUMENTS 3,611,832 A * 10/1971 Vollmer ................. F16H 37/00
475/198
3,618,711 A * 11/1971 Vollmer ............. F16H 57/0421
184/11.2

(Continued)

FOREIGN PATENT DOCUMENTS

| AU | 2002300578 B2 | 10/2003 |
|---|---|---|
| DE | 102010052278 A1 | 5/2011 |
| JP | H08337125 A | 12/1996 |
| WO | 2008133484 A1 | 9/2008 |
| WO | 2013032477 A1 | 3/2013 |

OTHER PUBLICATIONS

International Search Report (dated Apr. 28, 2014) for corresponding International App. PCT/US2013/072211.

(Continued)

*Primary Examiner* — Tisha D Lewis
(74) *Attorney, Agent, or Firm* — Withrow & Terranova, P.L.L.C.

(57) ABSTRACT

A vehicle having at least one rear driven axle. The vehicle includes a transmission, a main drive shaft, and a rear axle assembly. The rear axle assembly can selectively transmit power from the transmission to a rearmost set of wheels of the vehicle. To selectively transmit power, the rear axle assembly can include a rear axle input shaft, a neutralizer, a differential input shaft, and a differential. The neutralizer is used to mechanically connect and disconnect the rear axle input shaft from the differential input shaft.

11 Claims, 9 Drawing Sheets

(56) References Cited

U.S. PATENT DOCUMENTS

| | | | | |
|---|---|---|---|---|
| 4,194,586 | A | * 3/1980 | Hicks | B60K 17/346 180/24.09 |
| 4,700,820 | A | 10/1987 | Hickmann et al. | |
| 5,676,229 | A | * 10/1997 | Bates | F16D 48/066 192/109 F |
| 5,950,750 | A | 9/1999 | Dong et al. | |
| 8,398,520 | B1 | 3/2013 | Bassi et al. | |
| 2004/0089495 | A1 | 5/2004 | Strain | |
| 2006/0272866 | A1 | 12/2006 | Ziech | |
| 2008/0053780 | A1 | 3/2008 | Hamrin et al. | |
| 2010/0262326 | A1* | 10/2010 | Buszek | B60K 17/35 701/31.4 |
| 2013/0085031 | A1 | 4/2013 | Bassi et al. | |
| 2014/0057752 | A1* | 2/2014 | Ziech | B60K 17/36 475/221 |
| 2015/0266375 | A1* | 9/2015 | Tavvala | B60K 17/36 180/24.02 |

OTHER PUBLICATIONS

Written Opinion (dated Apr. 28, 2014) for corresponding International App. PCT/US2013/072211.
Wrecker 1. Metro Atlanta's Premier Towing Provider, 2012, pp. 1-3. Retrieved from internet:,URL: http://www.wrecker1.com/heavy-duty-towing-atlanta.html>.
Extended European Search Report dated May 15, 2017 for corresponding EP application No. 13898315.0.

* cited by examiner

VEHICLE WITH REAR DRIVE AXLE ASSEMBLY AND THE ABILITY TO NEUTRALIZE

FIELD OF INVENTION

The present invention relates, according to an aspect thereof, to vehicles having one or more rear drive axles and, more particularly, to such vehicles having the ability to neutralize the one or more rear drive axles.

BACKGROUND AND SUMMARY

Trucks and tractors are often referred to as 4×2, 6×4, 6×6, 8×8, 10×8, or 10×10 configurations based on the number of wheels and the number of driven wheels. A 6×4 configuration, for example, has three axles of at least two wheels each. Two of the axles (at least 4 wheels) are driven axles. Generally, each rear driven axle comprises a pair of half-shafts, each half-shaft on an opposite side of an axle assembly. Thus a truck with a 6×4 configuration would have at least four half-shafts being driven.

Figure 1:
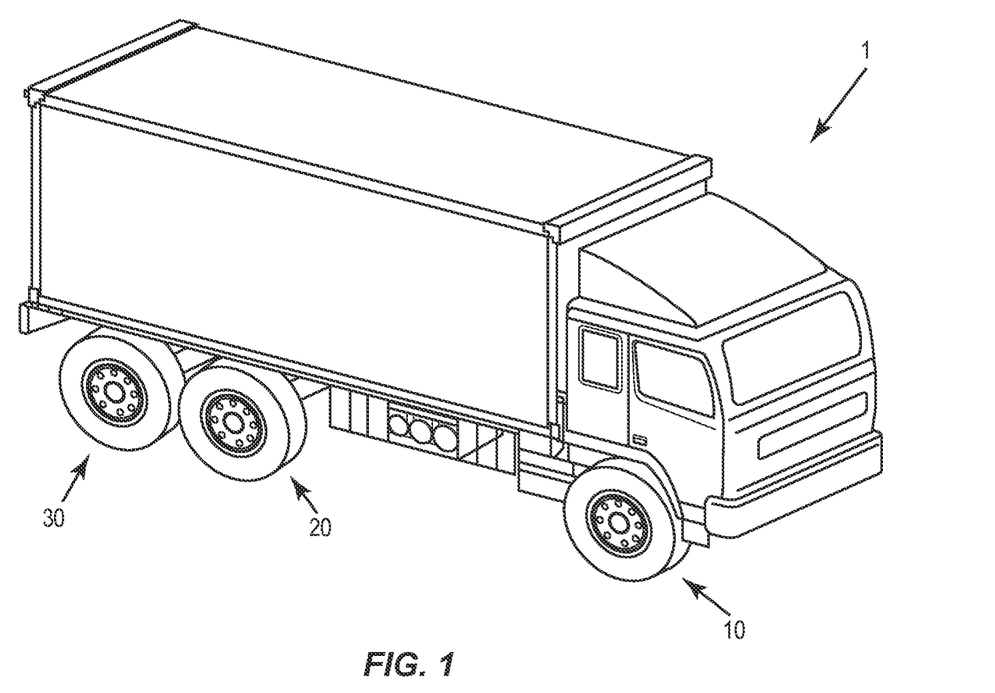
FIG. 1 shows a perspective view of a 6×4 truck in which the system of the present disclosure may be used.

FIG. 1 shows an example of a 6×4 truck 1. The truck 1 includes three axles supporting the wheels (a set of front wheels on a front axle 10, a set of intermediate wheels on an intermediate axle 20, and a set of rear wheels on a rear axle 30). In the truck 1 shown, it should be understood that the intermediate wheels/axle 20 and the rearmost wheels/axle 30 are both driven axles.

Figure 2:
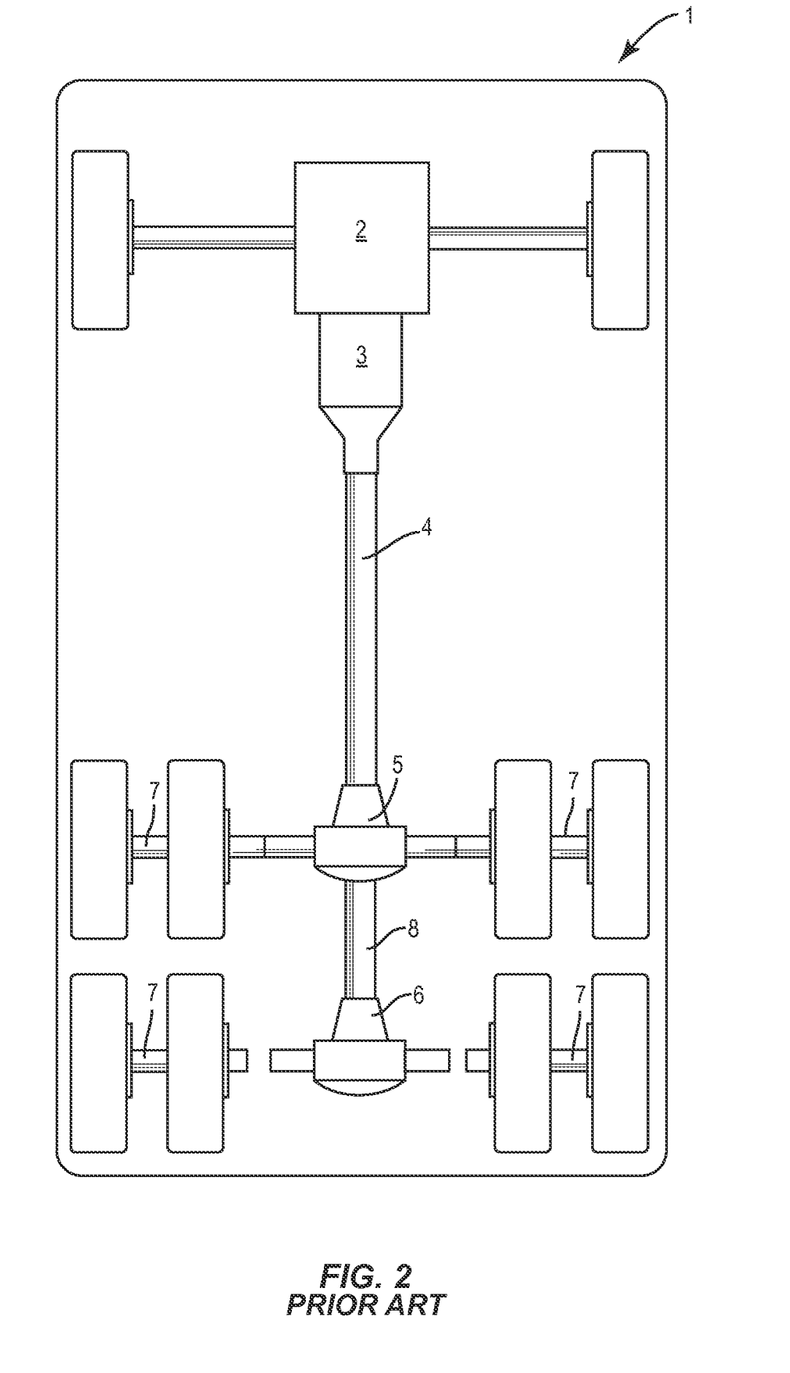
FIG. 2 schematically illustrates the drive train of a 6×4 truck according to the prior art.

FIG. 2 shows a schematic of the underside of the conventional 6×4 truck 1 from FIG. 1. The truck includes an engine 2, transmission 3, drive shaft 4, an intermediate axle assembly 5 and a rear axle assembly 6. Each axle assembly can include a differential. Each axle assembly 5, 6 is capable of transmitting motion from the drive shaft 4 to a pair of half-shafts 7. As seen in FIG. 2, the half-shafts 7 attached to the intermediate axle assembly 5 are shown in their normal operating position, while the half-shafts 7 associated with the rear axle assembly 6 have been "pulled" or removed from rotational engagement with the rear axle assembly 6, generally by moving each half-shaft 7 outward along its rotational axis.

Most current commercial trucks and tractors are heavy, and require special equipment when towed. These trucks may be towed after becoming disabled, or simply towed from the assembly plant to the dealership. Towing new trucks to dealerships avoids unnecessary mileage on the trucks. Trucks being delivered may be piggy-backed with one another to allow a single driver to transport a plurality of trucks. During towing, the cabin end of the truck or trailer is generally lifted off the ground by the towing truck, while one or more rear axles of the truck remain in contact with the road. Conventionally trucks are preferably towed only after the half-shafts 7 are "pulled." This labor intensive process can involve manually removing or "pulling" the half-shafts 7 from engagement with each axle assembly 5, 6. With the half-shafts pulled, the respective wheels are free to rotate without moving parts within each axle assembly 5, 6.

In situations where the half-shafts 7 are not pulled, wheel rotation will cause rotation of moving parts within the axle assemblies, particularly differentials therein. Rotation can also be transferred up to the transmission 3. In this case, extensive and expensive damage can occur within the transmission 3 or the differentials due to burn out, caused by insufficient lubrication within the transmission, and insufficient speed compensation within the differentials. If a 6×4 truck is being towed with both driven axles contacting the road (and half-shafts in place), the rotation of the wheels is passed to the half-shafts 7, through to an intermediate drive axle 8, forward through the drive axle 4 and into the transmission box 3. The transmission 3 may be in neutral, allowing the movement of the gears inside; however, available lubrication may be insufficient. During towing, the transmission 3 is likely tilted at an angle, causing a shift in the lubricating oil and preventing some gears or other components from being properly submerged and lubricated by oil splash. While driving, transmission gears may also be lubricated with active lubrication. In active lubrication, transmission fluid is sprayed, by a pump, onto the moving transmission parts, at a specified angle, to keep them moving freely. This spraying only occurs when the engine 2 is running and the transmission 3 is engaged through a mechanical clutch. The splashing of the submerged rotating gears can provide some lubrication but, by itself, the splashing is not likely sufficient to lubricate bearings and other components assembled in critical corners of the transmission. Therefore, while the truck is being towed with half-shafts 7 in place, the transmission parts are rotating with respect to one another without being properly lubricated. The moving parts can quickly become hot, burn, fall-apart or even fuse together.

If a 6×4 truck is being towed with the half-shafts engaged and only the rearmost wheels contacting the road, rotation of the rearmost wheels transmits motion to an interaxle differential within the intermediate axle assembly 5. The interaxle differential allows the rearmost wheels to rotate at a different speed than the intermediate wheels. Differentials are designed, however, to compensate for short term, relatively slight differences in speed. When the intermediate wheels are raised from surface contact (by the towing truck), the intermediate wheels will not be spinning as the truck is towed. This extreme speed difference between the intermediate wheels and the rearmost wheels can overwork the differential, potentially burning out the components therein and again causing the need for significant repairs.

Although pulling the half-shafts would alleviate this problem, in practice, this labor intensive process is often impractical or avoided. In the case of a disabled truck, environmental conditions may simply not allow the time and space necessary to perform this mechanical adaptation. For example, a disabled tractor along the highway may be surrounded by minimal, if any, shoulder. Further, highway authorities often require removal of a disabled truck as soon as possible, to allow other traffic to resume normal flow, even if that means leaving the half shafts in place. Prior to delivery, the need to disassemble or "pull" half-shafts provides an additional opportunity for error when the axles are reassembled upon delivery. For example, improper re-assembly of half-shafts can cause wheel end lubrication oil leaks.

Given the potential damage to moving parts, it has been suggested that the drive shaft 4 may be dropped, instead of pulling the rear half-shafts 7. This process involves manually removing the connection between the drive shaft 4 and the rear axles. However, this process is also labor and space intensive.

Accordingly, there is a need for a drive train configuration that allows for towing a rear axle driven truck that limits or eliminates damage to moving parts and avoids the manual, labor-intensive solutions of pulling the half-shafts or dropping the drive shaft when one or more driven rear axles remain in contact with the road.

Some embodiments of the present disclosure include a vehicle having at least one rear driven axle. The vehicle includes a transmission, a main drive shaft, and a rear axle assembly. The rear axle assembly can selectively transmit power from the transmission to a rearmost set of wheels of the vehicle. To selectively transmit power, the rear axle assembly can include a rear axle input shaft, a neutralizer, a differential input shaft, and a differential. The neutralizer is used to mechanically connect and disconnect the rear axle input shaft from the differential input shaft.

BRIEF DESCRIPTION OF THE DRAWINGS

The features and advantages of the present invention are well understood by reading the following detailed description in conjunction with the drawings in which like numerals indicate, similar elements and in which.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 3:
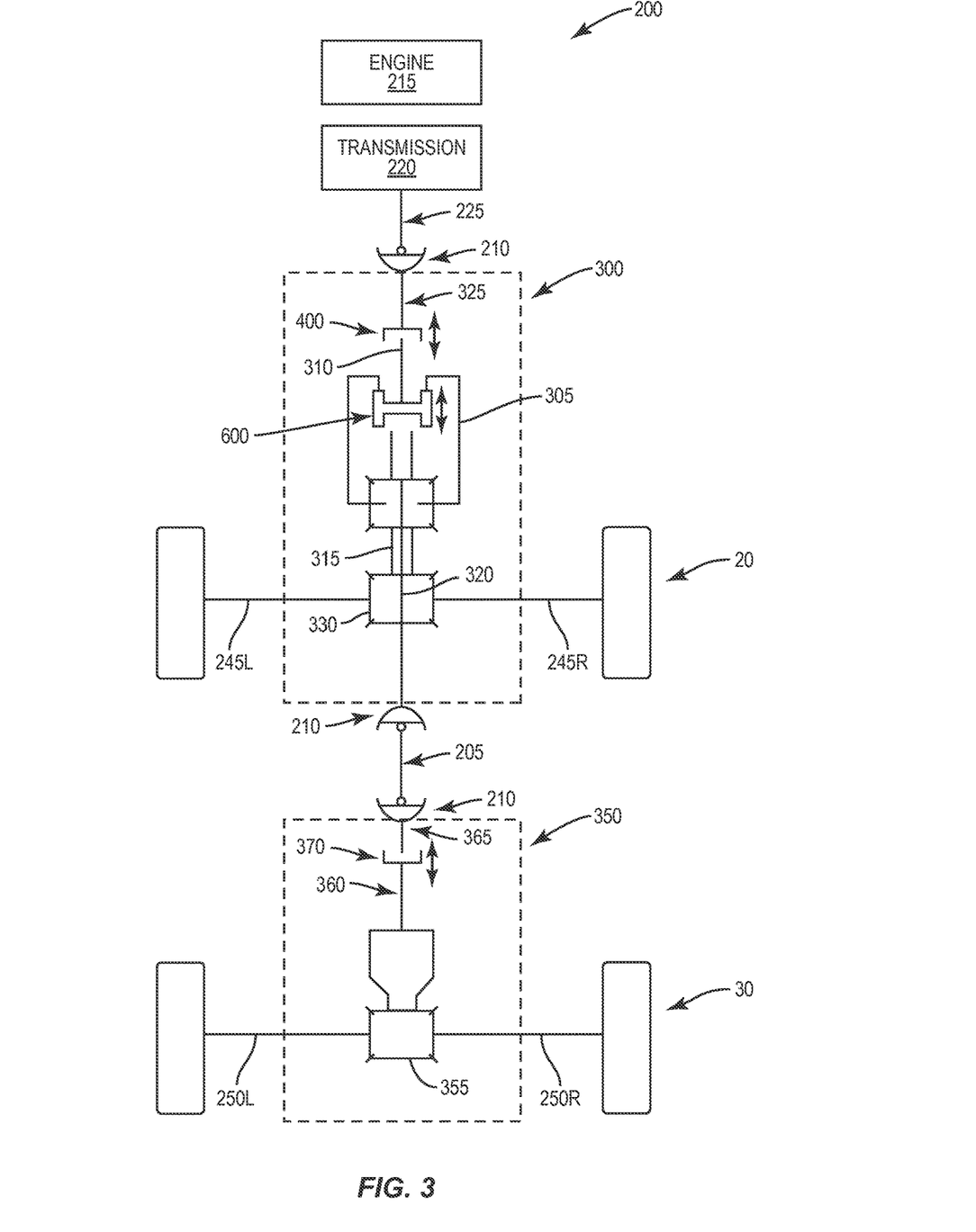
FIG. 3 schematically shows a 6×4 vehicle with a multiple drive axle assembly according to an aspect of the present invention.

FIG. 3 shows a schematic view of a drive train 200 for a vehicle having multiple rear drive axles according to an aspect of the present invention. The illustrated drive train 200 is a partial view of a so-called 6×4 configuration, with the four drive wheels shown. The vehicle may be a truck or a tractor.

As used herein, the terms forward and rearward are used to describe the relative positioning of elements with respect to each other and the vehicle in which the elements are used. The term forward is used for elements positioned toward the front of a vehicle and the term rearward is used for elements positioned relatively toward the back of a vehicle relative to the primary direction of travel of the vehicle.

The drive train 200 includes a forward axle assembly 300. Approximately from front to rear, the forward axle assembly 300 includes a forward axle assembly input shaft 325 coupled to a forward neutralizer 400. The forward neutralizer 400 selectively engages a forward interaxle differential input shaft 310 connected to a forward interaxle differential 305. The forward axle assembly 300 further comprises a first interaxle differential output shaft 315, and a second interaxle differential output shaft 320. The interaxle differential 305 distributes power from the interaxle differential input shaft 310 between the first and the second interaxle differential output shafts 315, 320.

A clutch 600 is provided in the forward axle assembly 300 to selectively bypass the forward interaxle differential 305 and lock relative rotation of the forward interaxle differential input shaft 310 and the first and second interaxle differential output shafts 315, 320.

A forward differential 330 is connected to the first interaxle differential output shaft 315 in order to distribute power between the forward half shafts 245.

In the embodiment of FIG. 3, the forward axle assembly 300 corresponds with the intermediate wheels/axle 20 of a 6×4 truck. In a 4×2 truck, the forward axle assembly 300 as described above could be omitted entirely (see FIG. 6 discussed further below). In other truck configurations with additional driven rear axles, such as 10×8, a forward axle assembly 300 as described above could correspond to each of the rear driven axles besides the rearmost driven axle.

Ahead of the forward axle assembly 300, an engine or motor 215 cooperates with a transmission 220 to rotate a major drive shaft 225 that is connected to the forward axle assembly input shaft 325 via a universal joint 210.

Behind the forward axle assembly 300, the drive train 200 further includes an intermediate drive shaft 205 that is connected to the second interaxle differential output shaft 320 via a universal joint 210.

The drive train 200 further includes a rear axle assembly 350 comprising a rear axle assembly input shaft 365 coupled between the intermediate drive shaft 205 and a rear neutralizer 370. The rear neutralizer 370 selectively engages with a rear differential input shaft 360 leading to a rear differential 355. The rear differential 355 is configured to allow for a speed difference between the left and right rear half shafts 250*l*, 250*r*, and the rear differential input shaft 360.

A rear axle assembly 350 as discussed above can be used to correspond with the rearmost axle of any rear driven truck. For example, the rear axle assembly 350 can be used on a 4×2 truck as discussed below as well as a 6×4, 6×6 or even larger trucks.

The operation of the drive train 200 is now discussed with respect to FIG. 3. Power transmitted to the first interaxle differential output shaft 315 is distributed to left and right forward half-shafts 245*l*, 245*r* by the forward differential 330. Power transmitted to the rear differential input shaft 360 via the rear neutralizer 370, rear axle assembly input shaft 365, intermediate drive shaft 205 and the second interaxle differential output shaft 320 is distributed to left and right rear half shafts 250*l*, 250*r* by the rear differential 355.

While the present invention has applications in vehicles with substantially any type of interaxle differential, such as bevel gear differentials, the present application shall be described in connection with an interaxle differential in the form of the Mack® Power Divider, available from Mack Trucks, Inc., Greensboro, N.C., USA.

Figure 4A:
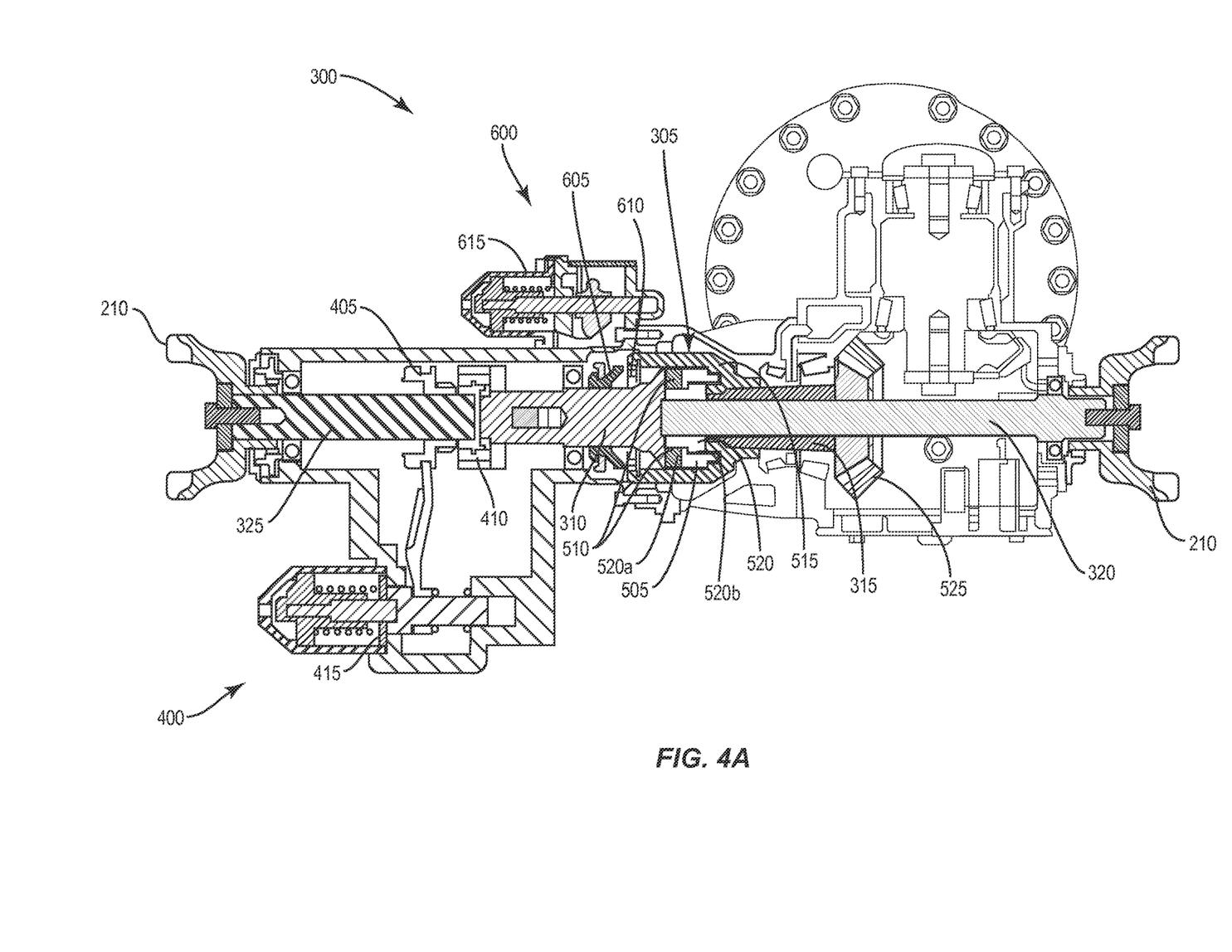
FIGS. 4A, 4B and 4C illustrate a partial cross-sectional side view showing the forward axle assembly in a neutral, normal, and locked positions respectively.
Figure 4B:
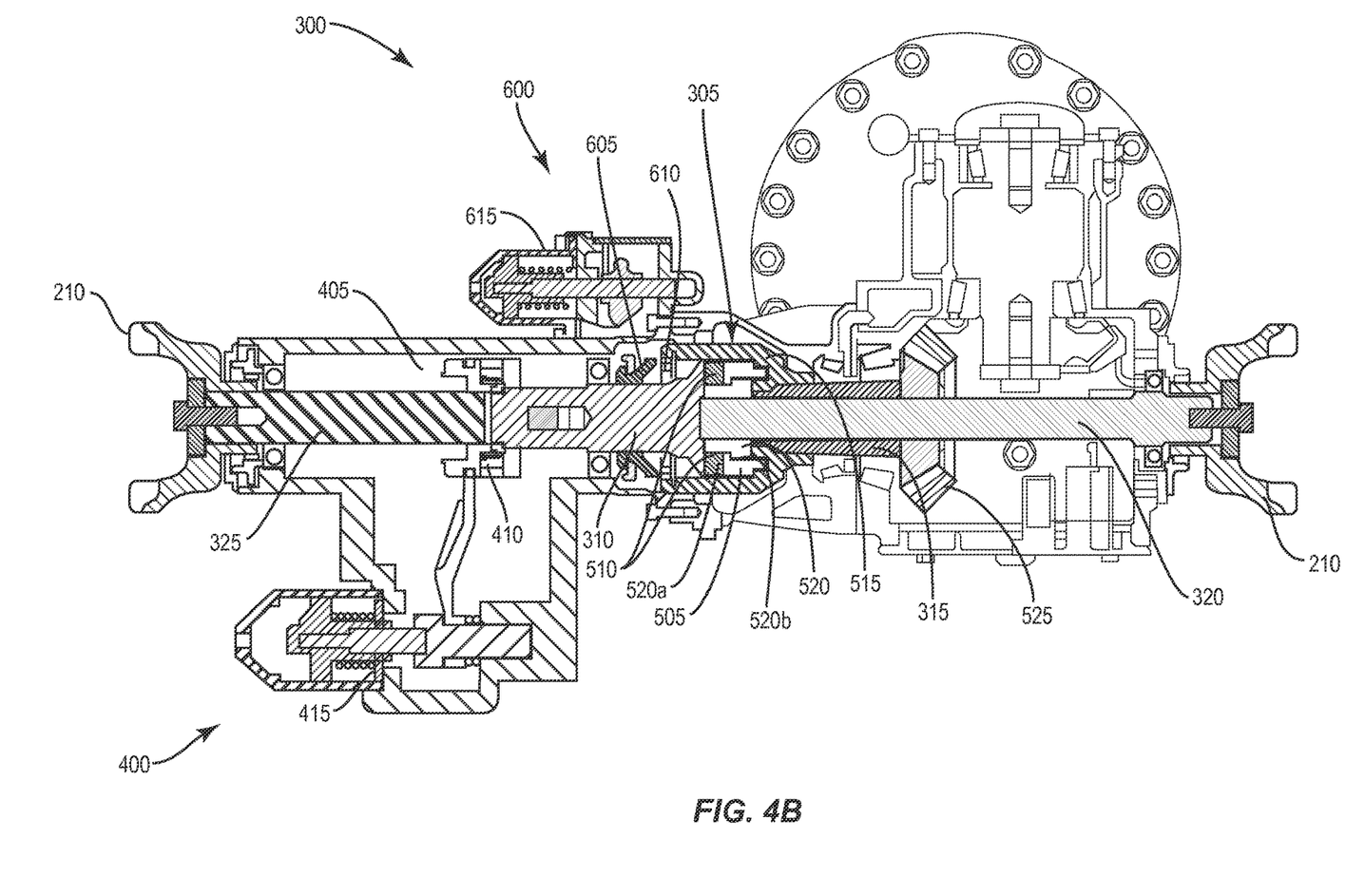
Figure 4C:
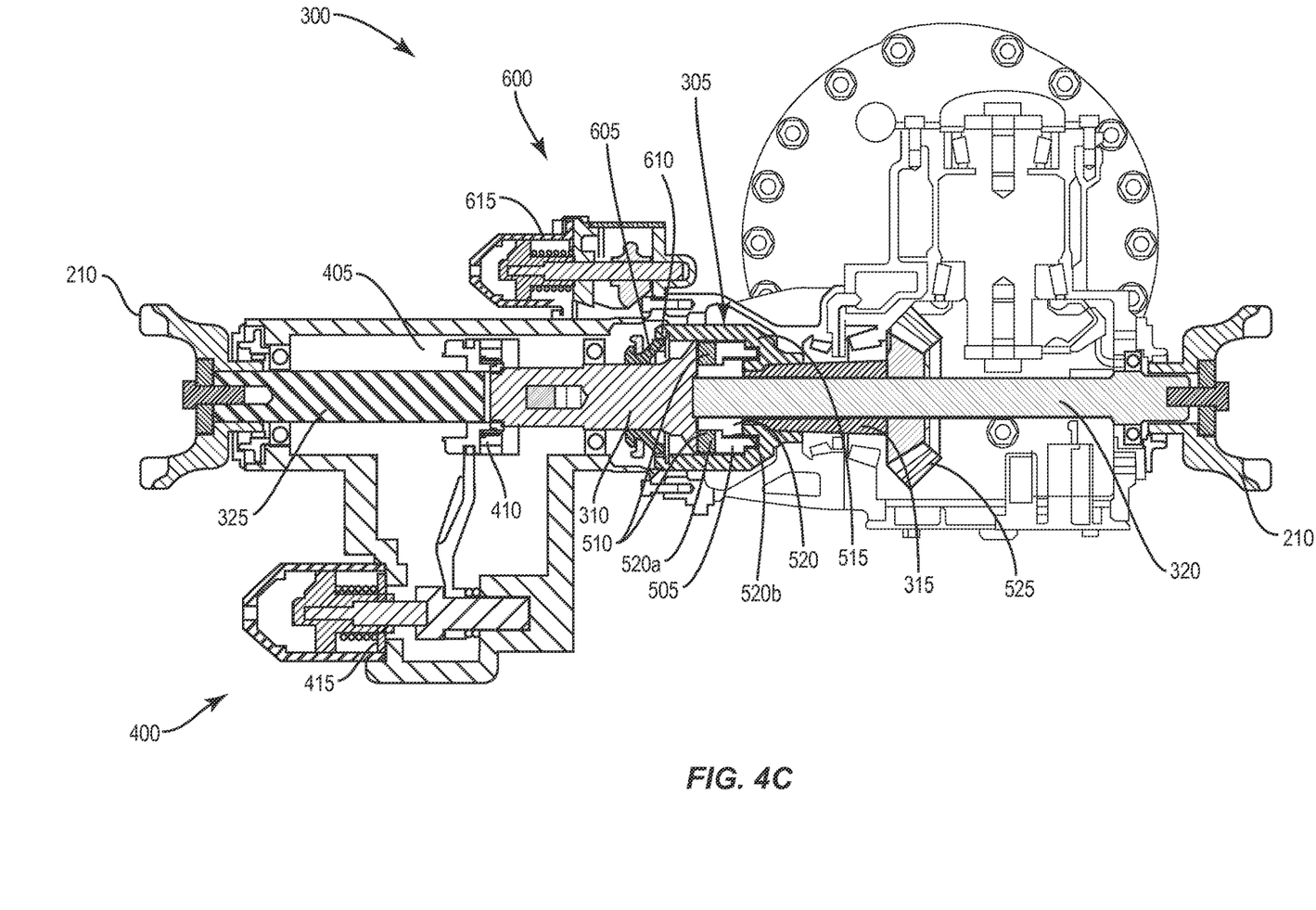

FIGS. 4A-4C show the forward axle assembly 300 in a plurality of operating positions. Generally, the interaxle differential input shaft 310 acts as a drive member of the interaxle differential 305. A ring or cage 505 is integrally provided at the end of the interaxle differential input shaft 310. The ring or cage 505 carries a plurality of radially extending plungers 510 in two rows. The plungers 510 are free to slide in holes in the cage 505. An outer cam 515 and an inner cam 520 are connected to, or formed at ends of, the first interaxle differential output shaft 315 and the second interaxle differential output shaft 320, respectively. The inner cam 520 is placed within the cage 505 and the outer cam 515 surrounds the cage 505 and the inner cam 520. Thus the cage 505 and the cams 515, 520 are in concentric relation, with the plungers 510 bearing on both the inner and outer cams 520, 515. The two rows of plungers 510 are indexed alternately, or staggered. Two rows of cam lobes 520a and 520b are also staggered on the inner cam 520. The lobes (not visible in FIG. 4) of the outer cam 515 are indexed uniformly across the width of the outer cam 515.

Relative motion between the cage 505 and either of the inner cam 520 or the outer cam 515 will cause the plungers 510 to reciprocate. The plungers 510 are pushed into the holes in the cage 505 as the plungers ride over the crests of the lobes 520a and 520b. The plungers 510 are allowed to move outwardly from the holes as they slide into valleys between the lobes. As the inner cam 520 and outer cam 515 are opposed, however, motion of a plunger 510, caused by one cam as it surmounts the crest of one lobe, causes motion on the plunger's other end so that the plunger forces the other cam to turn in the opposite relative direction. This action is analogous to a conventional differential except that it is accomplished by cams and plungers instead of by gears.

The second interaxle differential output shaft 320 is typically connected by a splined joint to the inner cam 520, and extends through the first interaxle differential output shaft 315. The outer cam 515 is typically formed at, or attached at an end of, the first interaxle differential output shaft 315. The first interaxle differential output shaft 315 typically comprises, at an end opposite the outer cam 515, a bevel gear pinion 525 that forms part of the forward differential 330.

According to some embodiments of the present disclosure, the clutch 600 (power divider lock-out mechanism) can include a first clutch position in which the clutch 600 rotationally locks the interaxle differential input shaft 310 to the first and second interaxle differential output shafts 315, 320. The clutch 600 can also include a second clutch position in which the interaxle differential input shaft 310 is not locked to the first and second interaxle differential output shafts 315, 320, but still transmits motion thereto. An example of a clutch 600 suitable for use with the present invention is the air lock out arrangement available with the Mack® Power Divider from Mack Trucks, Inc., Greensboro, N.C., USA.

In the illustrated interaxle differential 305, the clutch 600 comprises a second externally splined ring 605 disposed around the interaxle differential input shaft 310. The second externally splined ring 605 is axially movable. A spline (not shown) located on the interaxle differential input shaft 310 causes the second externally splined ring 605 to rotate with, and not relative to, the interaxle differential input shaft 310. An actuator, such as second piston arrangement 615, is provided for moving the second externally splined ring 605 back and forth relative to the outer cam 515. The second piston arrangement 615 can be pneumatically operated, or may be hydraulically or electrically operated instead.

The outer cam 515 comprises internal splines 610 that mate with the external splines on the second externally splined ring 605. When mated, the spines rotationally lock the interaxle differential input shaft 310 to the first interaxle differential output shaft 315 because the outer cam 515 is attached to the first interaxle differential output shaft 315. At the same time, the clutch 600 rotationally locks the interaxle differential input shaft 310 to the second interaxle differential output shaft 320 through the interaxle differential 305. This occurs because relative motion of the outer cam 515 and the cage 505 is not possible, and relative motion of the inner cam 520 and the cage 505 is also not possible. When the clutch 600 is in the clutch first position, the clutch 600 thus effectively rotationally locks the interaxle differential input shaft 310 to the intermediate drive shaft 205 through the second interaxle differential output shaft 320 and the universal joint 210.

The forward neutralizer 400 can be similar to the clutch 600, except that no cams are required, and structures corresponding to the inner cam and cage are omitted. An illustrative forward neutralizer 400 is seen in FIGS. 4A-4C. The illustrated forward neutralizer 400 is positioned between a universal joint 210 and the interaxle differential 305. A first externally splined ring 405 is positioned around the forward axle assembly input shaft 325 to be axially movable, but rotationally fixed, thereto. The first externally splined ring 405 is driven axially by a first piston arrangement 415. An internally splined sleeve 410 is formed at, or attached to, an end of the interaxle differential input shaft 310. The sleeve 410 may be held in position with snap-rings, located in front and back of the sleeve 410 to properly position the sleeve 410 along the input shaft 310. The first externally splined ring 405 is movable between a first, front neutralizer position (neutral, FIG. 4A) and a second, rearward neutralizer position (normal, FIGS. 4B and 4C). In the first neutralizer position, the first externally splined ring 405 is disengaged with the internally splined sleeve 410 such that the forward axle assembly input shaft 325 and the interaxle differential input shaft 310 are rotationally disconnected (neutralized). In the second neutralizer position the first externally splined ring 405 engages with the internal splined sleeve 410 so that the forward neutralizer 400 rotationally locks the forward axle assembly input shaft 325 and the interaxle differential input shaft 310, causing them to rotate together (normal). The first piston arrangement 415 can be the same piston arrangement used in the air lock out arrangement available with the Mack Power Divider from Mack Trucks, Inc., Greensboro, N.C. USA. Alternatively, any other suitable means for moving the first externally splined ring 405 relative to the forward axle assembly input shaft 325 may be used.

FIG. 4A shows vehicle forward axle assembly neutral position. The forward axle assembly neutral position is defined by the forward neutralizer 400 in the first, front neutralizer position. The clutch 600 can be in either the first or second clutch position. In the forward axle assembly neutral position, rotation of the forward axle assembly input shaft 325 will not cause rotation of the interaxle differential input shaft 310 and vice versa. Therefore, while the vehicle is being towed, with intermediate wheels/axle 20 on the ground, rotation of the rear wheels in contact with the road will not result in the transfer of motion back into the transmission 220, because of the rotational break created by the forward neutralizer 400.

FIG. 4B shows a forward axle assembly normal position. The forward axle assembly normal position is defined by the forward neutralizer 400 in its second, rearward neutralizer position and the clutch 600 in the first clutch position. The forward axle assembly normal position will be used during standard operation of the vehicle. With the forward neutralizer 400 in its second, rearward position, rotational motion is transferred from the forward axle assembly input shaft 325 to the interaxle differential input shaft 310. Thus power created by the transmission 220 will be able to reach the forward axle assembly 300 and the rear axle assembly 350.

The forward axle assembly normal position, particularly the first position of the clutch 600, takes advantage of the interaxle differential 305, allowing for variation in speed between the forward half-shafts 245 and the rear half-shafts 250. This ability to allow for differences in speed improves the handling of the vehicle. Particularly, the differentials assist handing of the vehicle during cornering or when each wheel has a different degree of traction.

FIG. 4C shows vehicle forward axle assembly locked position. The forward axle assembly locked position is defined by the forward neutralizer 400 in its second, rearward position and the clutch 600 also in its second position. With the forward neutralizer 400 in the second, rearward position, rotational motion is transferred from the forward axle assembly input shaft 325 to the interaxle differential input shaft 310. Thus motion created by the transmission 220 will be able to reach the forward axle assembly 300 and the rear axle assembly 350. The forward axle assembly locked position, particularly the second position of the clutch 600, synchronizes the rotational speeds of the interaxle differential input shaft 310 and the second interaxle differential output shaft 320. This forward axle assembly locked position is most useful when there is a significant difference in traction between the intermediate wheels/axle 20 and the rear wheels/axle 30; particularly where one axle has virtually no traction. In this case using the locked position will allow the truck to apply maximum torque to the axle with traction instead of passing torque to the slipping wheels and potentially harming the differential.

FIGS. 4A-4C show the forward axle assembly input shaft 325 terminating by a forward end of the internally splined sleeve 410. It will be appreciated that a variety of alternative configurations can be provided. For example, the forward axle assembly input shaft 325 can extend all the way through the center of the splined sleeve 410 and, if desired, the interaxle differential input shaft 310, which can be advantageous in that it can reduce load on inner (usually needle roller) bearings.

Figure 5A:
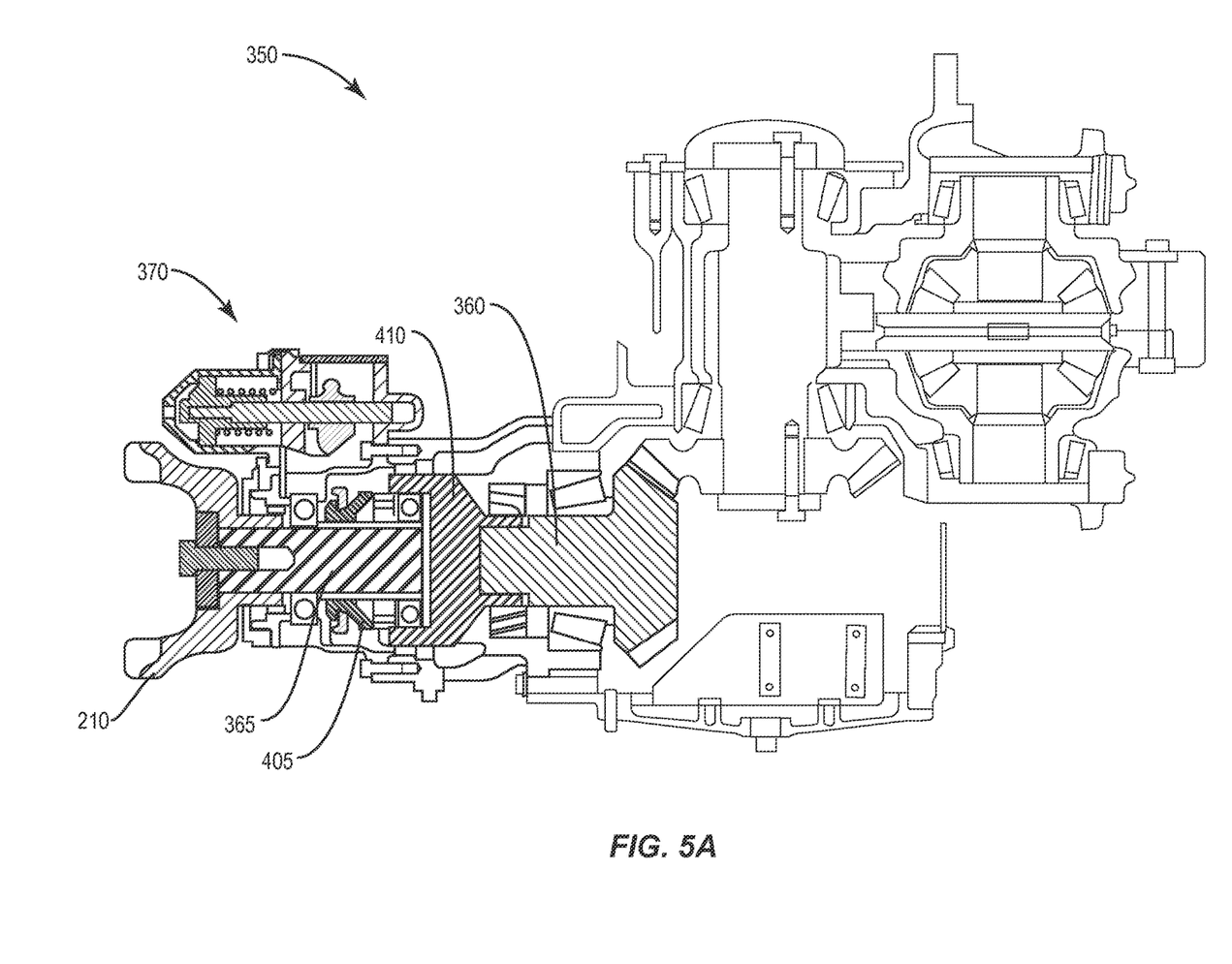
FIGS. 5A and 5B illustrate a partial cross-sectional side view showing the rear axle assembly in neutral and normal positions respectively.
Figure 5B:
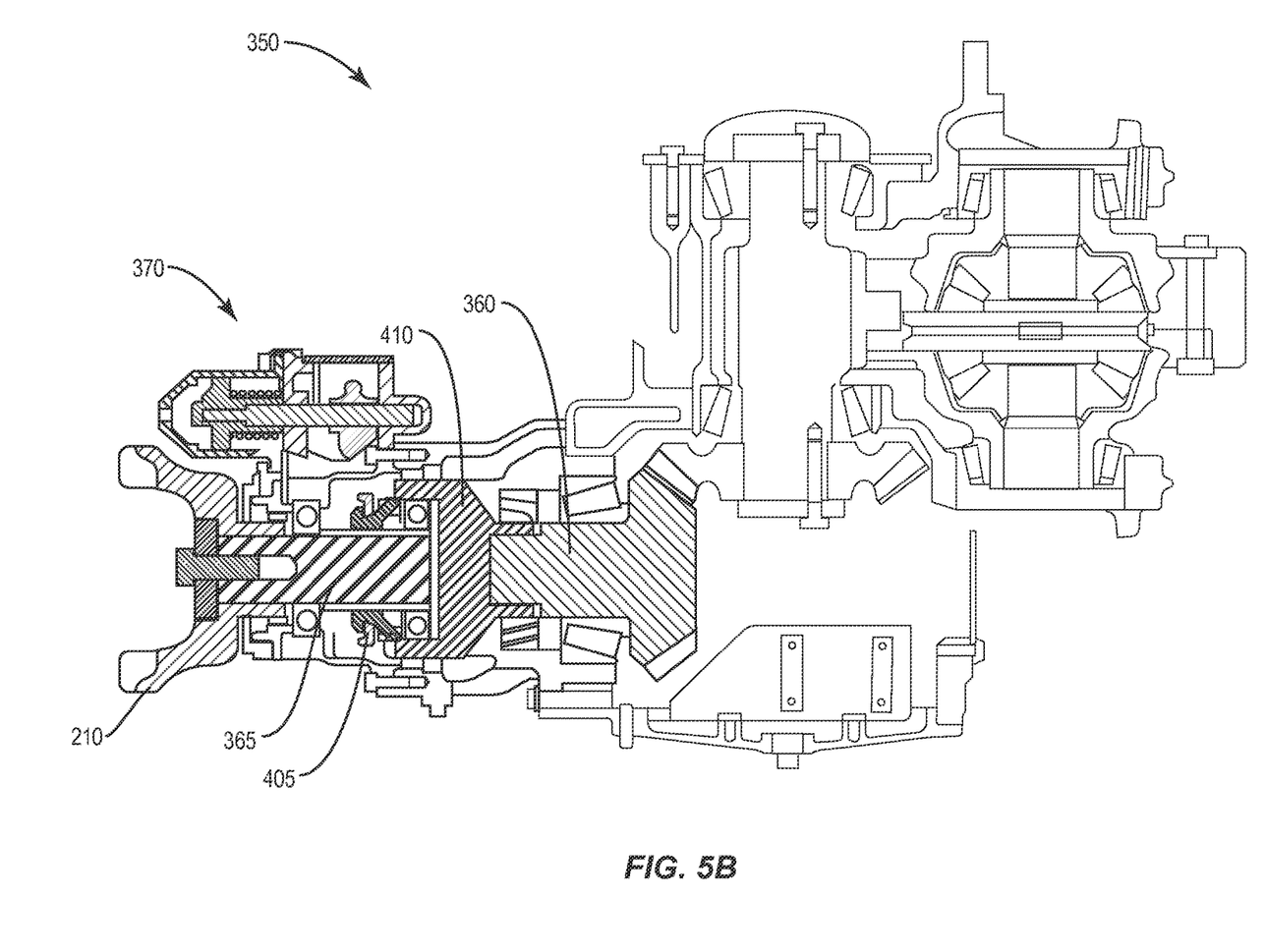

As shown in FIGS. 5A and 5B, the rear axle assembly 350 also provides a rear axle assembly neutral position (FIG. 5A) and a rear axle assembly normal position (FIG. 5B) based on the selected position of the rear neutralizer 370. The rear neutralizer 370 will be understood by one of ordinary skill in the art to function substantially similarly to the forward neutralizer 400 discussed above. Therefore, in the neutral position the rear neutralizer 370 will prevent the transfer of motion between the rear axle assembly input shaft 365 and the rear differential input shaft 360. In the normal position the rear neutralizer 370 will rotationally lock the rear axle assembly input shaft 365 with the rear differential input shaft 360 such that rotation of one causes rotation of the other.

The rear neutralizer 370 provides for neutralization of the rear axle 30 independent of the neutralization of intermediate axle 20. In the 6×4 embodiment of FIG. 3, the rear neutralizer 370 is provided for situations where only one of the intermediate axle 20 and the rear axle 30 are in steady contact with the ground. In a first example, rear axle 30 may be lifted from contact with the ground to improve the handling and efficiency of the 6×4 truck under light loads. Lifting of the rear axle 30 can be preferred by any known bogie lifting system. When the rear axle 30 is lifted, it is preferably that the rear axle 30 does not rotate unnecessarily. Thus the rear neutralizer 370 may be positioned in the neutral position.

In a second example, the truck 1 may be towed with only the rear axle 30 contacting the road. In this case, rotation of the rear wheels should not only avoid motion within the transmission 220 as could be provided by the forward neutralizer 400, but should also above motion within the interaxle differential 330. Providing the rear neutralizer 370 can prevent transfer of motion out of the rear axle assembly 350 when the rear axle assembly 350 corresponds to the only axle in contact with the road.

The drive train 200 of the present disclosure facilitates an improved method of towing a vehicle having at least one rear driven axle. The method includes raising the front portion of the vehicle such that the front wheels/axle 10 are removed from contact with the road surface. Preferably the step of lifting leaves all but the front wheels 10 still in contact with the road. Alternatively, the step of lifting leaves at least one set of wheels 20, 30 in contact with the road. The method of towing further includes the step of using one or more neutralizers 400, 370 to separate motion within the rolling wheels' axle assembly from, a) an axle assembly corresponding to the lifted wheels and b) the transmission 220.

For towing a 6×4 truck with only the front wheels 10 lifted, only the forward neutralizer 400 is activated. For towing a 6×4 truck with the front wheels 10 and intermediate wheels 20 lifted, only the rear neutralizer 370 is activated. For towing a 6×4 truck with the front wheels 10 and the rear wheels 30 lifted, both the forward neutralizer 400 and the rear neutralizer 370 should be activated. The step of activating a neutralizer, for example forward neutralizer 400, may comprise triggering a first piston arrangement 415 to move from a second, rearward position, to a first, forward position. Movement of the first piston arrangement 415 may result in a first externally splined ring 405 becoming disengaged from a splined sleeve 410 because of translational motion of the first externally splined ring 405. Without engagement of the first externally splined ring 405 with the splined sleeve 410, a rotational break is created between the respective axle assembly input shaft and the respective differential input shaft.

The method of towing further comprises pulling the vehicle from a first location to a second location after the steps of lifting and neutralizing have been performed.

Figure 6:
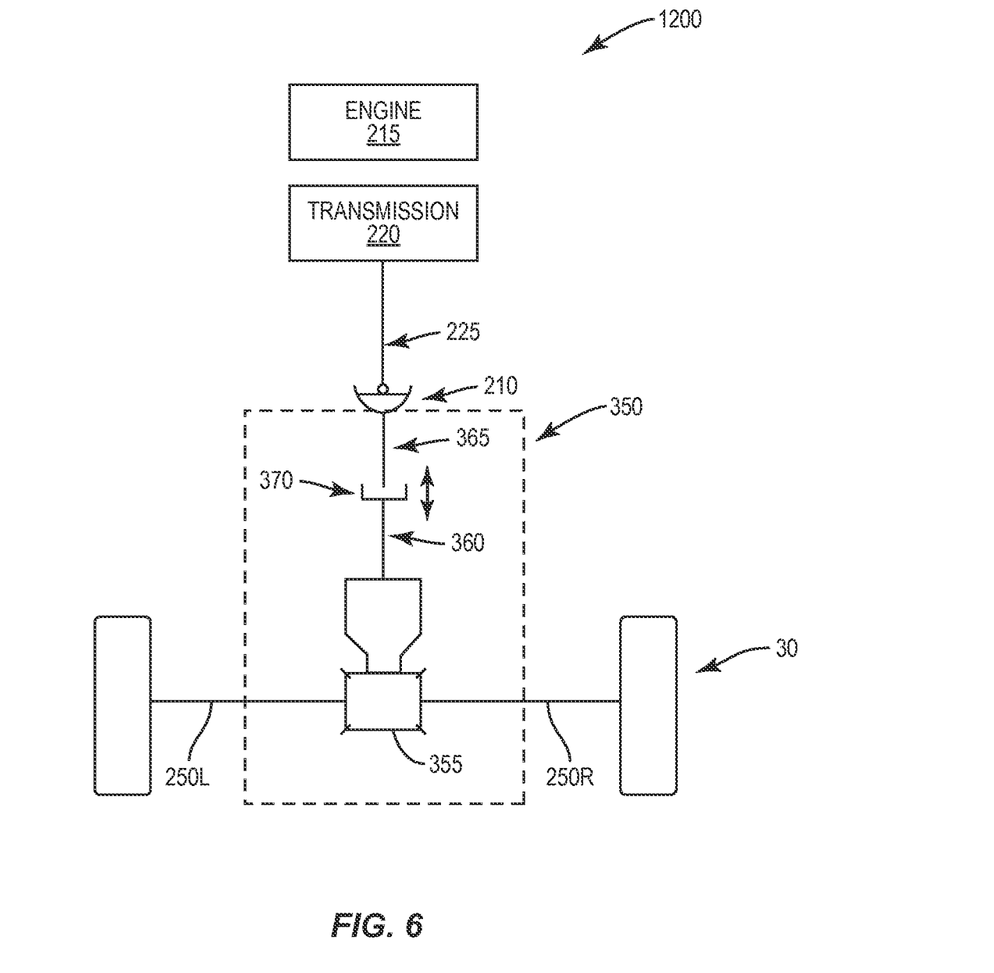
FIG. 6 schematically shows a 4×2 vehicle according to an aspect of the present invention.

Turning to FIG. 6, a drive train 1200 of the present disclosure is shown in a 4×2 embodiment. The 4×2 embodiment is substantially similar to the 6×4 embodiment without the forward axle assembly 300. The 4×2 embodiment is able to provide the same towing advantages by using the rear neutralizer 370 to prevent motion of rolling rear wheels 30 from being transferred to the transmission 220. Because speed compensation between separate rear axles is unnecessary the rear axle assembly 350 does not require the clutch 600 found within the forward axle assembly 300 of the 6×4 embodiment. As should be understood from the preceding, the neutralizers of the present disclosure are useful when towing a truck with drive axles rolling along the road surface. In the 4×2 embodiment it may be possible to tow the truck rear end first, but the weight distribution of the truck, particularly if loaded, does allow this alternative towing arrangement.

It is noted that the positioning of the neutralizers 400, 370 at the forward end of their respective axle assemblies 300, 350 is important for packaging size and simplicity. Particularly, providing the rear neutralizer 370 within the rear axle assembly 350 instead of at the back of the forward axle assembly 300 provides the ability to use the same rearmost axle assembly 350 regardless of truck configuration. In other words, a 6×4 and a 4×2 would have the same rear axle assembly 350 as shown above.

The forward axle assembly 300 with the forward neutralizer 400 (and the rear axle assembly 350 with the rear neutralizer 370 in the 4×2 configuration) may allow for reduced transmission complexity by replacing the need for a transmission neutralizer. A transmission neutralizer is presently incorporated within many truck transmissions to neutralize the final gear while allowing driven motion of the other gears for use by a side mounted power take off (PTO). A side mounted PTO is used to power auxiliary applications such as water pumps within a fire engine, the hydraulic system of a bucket truck or a winch of a tow truck, all while the truck is intended to remain stationary. Presently, running the side mounted power take off requires transmission neutralization through a transmission mounted three-position piston/cylinder, further increasing the size and complexity of the transmission. By using the forward neutralizer 400 instead, the side mounted power take off can be used with a more simple transmission structure, eliminating the need for the transmission-mounted three-position piston/cylinder which would otherwise be necessary to disconnect the major drive shaft 225 during PTO operation.

In the present application, the use of terms such as "including" is open-ended and is intended to have the same meaning as terms such as "comprising" and not preclude the presence of other structure, material, or acts. Similarly, though the use of terms such as "can' or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

Example embodiments of the present disclosure can be described in accordance with the following paragraphs:

Paragraph 1: A vehicle having a multiple driven rear axles, comprising:
a. a forward axle assembly (300) comprising:
 i. a forward axle assembly input shaft (325);
 ii. an interaxle differential (305);
 iii. an interaxle differential input shaft (310);
 iv. a first interaxle differential output shaft (315);
 v. a second interaxle differential output shaft (320); and
 vi. a forward neutralizer (400) between the forward axle assembly input shaft (325) and the interaxle differential (305),
wherein the interaxle differential (305) distributes power from the interaxle differential input shaft (310) between the first and the second interaxle differential output shafts;
b. an intermediate drive shaft (205) connected to the second interaxle differential output shaft (320);
c. a rear axle assembly (350) comprising:
 i. a rear differential (355);
 ii. a rear differential input shaft (360); and
wherein the forward neutralizer (400) is movable between a first neutralizer position in which rotation of the forward axle assembly input shaft (325) does not transmit motion to the interaxle differential input shaft (310), and a second neutralizer position in which rotation of the forward axle assembly input shaft (325) does transmit motion to the interaxle differential input shaft (310).

Paragraph 2: The vehicle as set forth in paragraph 1, further comprising:
a clutch (600) between the interaxle differential input shaft (310) and the interaxle differential (305),
wherein the clutch (600) is movable between a first clutch position in which the interaxle differential input shaft is not locked to the first and second interaxle differential output shafts (315, 320) and a second clutch position in which the clutch rotationally locks the interaxle differential input shaft to the first and second interaxle differential output shafts.

Paragraph 3: The vehicle as set forth in paragraph 2, wherein the second interaxle differential output shaft (320) is rotationally connected to the intermediate drive shaft (205) by a universal joint (210), and the clutch (600) rotationally locks the interaxle differential input shaft (310) to the intermediate drive shaft (205) by rotationally locking the interaxle differential input shaft (310) to the first and second interaxle differential output shafts (315, 320).

Paragraph 4: The vehicle as set forth in paragraph 1, wherein the forward neutralizer (400) rotationally locks the forward axle assembly input shaft (325) to the interaxle differential input shaft (310) when the neutralizer is in the second neutralizer position.

Paragraph 5: The vehicle as set forth in paragraph 4, wherein the forward neutralizer (400) includes a splined ring (405) that can translate along, and rotate with, the forward axle assembly input shaft (325), wherein the splined ring is positioned forward in the first neutralizer position and positioned rearward in the second neutralizer position.

Paragraph 6: The vehicle as set forth in paragraph 5, wherein the forward neutralizer (400) also includes a splined sleeve (410) attached to a forward end of the interaxle differential input shaft (310), wherein the splined sleeve (410) mates with the splined ring (405) when the neutralizer is in the second neutralizer position.

Paragraph 7: The vehicle set forth in paragraph 1, wherein the rear axle assembly further comprises:
i. a rear axle assembly input shaft (365); and
ii. a rear neutralizer (370) connected between the rear axle assembly input shaft and the rear differential input shaft (360), wherein
the rear neutralizer (370) being movable between a first neutralizer position in which rotation of the rear axle assembly input shaft (365) does not transmit motion to the rear differential input shaft (360), and a second neutralizer position in which rotation of the rear axle assembly input shaft (365) does transmit motion to the rear differential input shaft (360).

Paragraph 8: A vehicle having a rear driven axle, comprising:
a. a transmission;
b. a main drive shaft; and
c. a rear axle assembly (350) configured to selectively transmit power from the transmission to a rearmost set of wheels of the vehicle, the rear axle assembly comprising:
 i. a rear axle input shaft (365);
 ii. a neutralizer (370);
 iii. a differential input shaft (360); and
 iv. a differential (355);
wherein the neutralizer is capable of mechanically disconnecting the rear axle input shaft (365) from the differential input shaft (360).

Paragraph 9: The vehicle as set forth in paragraph 8, wherein the neutralizer (370) is movable between a first neutralizer position in which rotation of the rear axle assembly input shaft (365) does not transmit motion to the differential input shaft (360), and a second neutralizer position in which rotation of the rear axle assembly input shaft (365) does transmit motion to the differential input shaft (360).

Paragraph 10: The vehicle as set forth in paragraph 9, wherein the neutralizer (370) includes a splined ring (405) that can translate along, and rotate with, the rear axle assembly input shaft (360), wherein the splined ring is positioned forward in the first neutralizer position and positioned rearward in the second neutralizer position.

Paragraph 11: A method of towing a vehicle having multiple rear driven axles, comprising:
 a. providing a vehicle with at least one driven rear axle, each driven rear axle having a respective axle assembly;
 b. lifting the vehicle such that one or more front axles are elevated from contact with a road surface and one or more of the at least one rear axles remains contacting the road surface;
 c. neutralizing one or more of said at least one rear axles whose wheels contact the road surface,
 wherein the step of neutralizing comprises using an actuator of a neutralizer to disengage rotational communication between the axle assembly of said rear axle in contact with the road surface and a transmission of the vehicle; and
 c. after performing steps a. and b., transporting the vehicle from a first location to a second location while the rotation of the at least one rear axle contacting the road surface does not cause rotation of parts within the transmission of the vehicle.

Paragraph 12: The method of towing as set forth in paragraph 11, wherein the step of using an actuator comprises translating an externally splined ring along a shaft rotationally locked to an output shaft of the transmission.

Paragraph 13: The method of towing as set forth in paragraph 11, wherein each axle of the vehicle comprises a pair of half-shafts rotationally connected to the respective axle assembly, and the step of neutralizing includes maintaining rotational connection between each half-shaft and the respective axle assembly.

Paragraph 14: The method of towing as set forth in paragraph 11, wherein the step of providing a vehicle further comprises providing a vehicle with a separate neutralizer for each driven rear axle;
 the step of lifting comprises lifting all but the rearmost axle from the ground; and
 the step of neutralizing comprises actuating only the neutralizer corresponding to the rearmost axle.

Paragraph 15. The method of towing as set forth in paragraph 11, wherein the step of providing a vehicle further comprises providing a vehicle with a plurality of driven rear axles and a separate neutralizer for each driven rear axle;
 the step of lifting comprises lifting the at least one front axle from the ground and separately lifting the rearmost axle from the ground; and
 the step of neutralizing comprises actuating the neutralizer corresponding to the rearmost axle to prevent rotation thereof and actuating the neutralizer corresponding to the frontmost driven rear axle to prevent rotation of elements within the transmission of the vehicle.

While this invention has been illustrated and described in accordance with a preferred embodiment, it is recognized that variations and changes may be made therein without departing from the invention as set forth in the claims.

What is claimed is:

1. A method of towing a vehicle having multiple rear driven axles, comprising:
 a. providing a vehicle with at least one driven rear axle, each driven rear axle having a respective axle assembly;
 b. lifting the vehicle such that one or more front axles are elevated from contact with a road surface and one or more of the at least one rear axles remains contacting the road surface;
 c. neutralizing one or more of said at least one rear axles whose wheels contact the road surface,
  wherein the step of neutralizing comprises using an actuator of a neutralizer to disengage rotational communication between the axle assembly of said rear axle in contact with the road surface and a transmission of the vehicle; and
 d. after performing steps a. and b., transporting the vehicle from a first location to a second location while the rotation of the at least one rear axle contacting the road surface does not cause rotation of parts within the transmission of the vehicle.

2. The method of towing as set forth in claim 1, wherein the step of using an actuator comprises translating an externally splined ring along a shaft rotationally locked to an output shaft of the transmission.

3. The method of towing as set forth in claim 1, wherein each axle of the vehicle comprises a pair of half-shafts rotationally connected to the respective axle assembly, and the step of neutralizing includes maintaining rotational connection between each half-shaft and the respective axle assembly.

4. The method of towing as set forth in claim 1, wherein the step of providing a vehicle further comprises providing a vehicle with a separate neutralizer for each driven rear axle;
 the step of lifting comprises lifting all but the rearmost axle from the ground; and
 the step of neutralizing comprises actuating only the neutralizer corresponding to the rearmost axle.

5. The method of towing as set forth in claim 1, wherein the step of providing a vehicle further comprises providing a vehicle with a plurality of driven rear axles and a separate neutralizer for each driven rear axle;
 the step of lifting comprises lifting the at least one front axle from the ground and separately lifting the rearmost axle from the ground; and
 the step of neutralizing comprises actuating the neutralizer corresponding to the rearmost axle to prevent rotation thereof and actuating the neutralizer corresponding to the frontmost driven rear axle to prevent rotation of elements within the transmission of the vehicle.

6. A vehicle having a multiple driven rear axles, comprising:
 a. a forward axle assembly comprising:
  i. a forward axle assembly input shaft;
  ii. an interaxle differential;
  iii. an interaxle differential input shaft;
  iv. a first interaxle differential output shaft;
  v. a second interaxle differential output shaft; and
  vi. a forward neutralizer between the forward axle assembly input shaft and the interaxle differential,
  wherein the interaxle differential distributes power from the interaxle differential input shaft between the first and the second interaxle differential output shafts;
 b. an intermediate drive shaft connected to the second interaxle differential output shaft;
 c. a rear axle assembly comprising:
  i. a rear axle assembly input shaft;
  ii. a rear differential;
  iii. a rear differential input shaft; and,
  iv. a rear neutralizer connected between the rear axle assembly input shaft and the rear differential input shaft, wherein
  the forward neutralizer is movable between a first neutralizer position in which rotation of the forward axle assembly input shaft does not transmit motion to the interaxle differential input shaft, and a second neutralizer position in which rotation of the forward axle assembly input shaft does transmit motion to the interaxle differential input shaft and wherein the rear neutralizer is movable between a first neutralizer position in which rotation of the rear axle assembly input shaft does not transmit motion to the rear differential input shaft, and a second neutralizer position in which rotation of the rear axle assembly input shaft does transmit motion to the rear differential input shaft.

7. The vehicle as set forth in claim 6, further comprising:
a clutch between the interaxle differential input shaft and the interaxle differential,
wherein the clutch is movable between a first clutch position in which the interaxle differential input shaft is not locked to the first and second interaxle differential output shafts and a second clutch position in which the clutch rotationally locks the interaxle differential input shaft to the first and second interaxle differential output shafts.

8. The vehicle as set forth in claim 7, wherein the second interaxle differential output shaft is rotationally connected to the intermediate drive shaft by a universal joint and the clutch rotationally locks the interaxle differential input shaft to the intermediate drive shaft by rotationally locking the interaxle differential input shaft to the first and second interaxle differential output shafts.

9. The vehicle as set forth in claim 6, wherein the forward neutralizer rotationally locks the forward axle assembly input shaft to the interaxle differential input shaft when the neutralizer is in the second neutralizer position.

10. The vehicle as set forth in claim 9, wherein the forward neutralizer includes a splined ring that can translate along, and rotate with, the forward axle assembly input shaft, wherein the splined ring is positioned forward in the first neutralizer position and positioned rearward in the second neutralizer position.

11. The vehicle as set forth in claim 10, wherein the forward neutralizer also includes a splined sleeve attached to a forward end of the interaxle differential input shaft, wherein the splined sleeve mates with the splined ring when the neutralizer is in the second neutralizer position.

* * * * *